(12) United States Patent
Assael et al.

(10) Patent No.: US 12,046,249 B2
(45) Date of Patent: Jul. 23, 2024

(54) BANDWIDTH EXTENSION OF INCOMING DATA USING NEURAL NETWORKS

(71) Applicant: DeepMind Technologies Limited, London (GB)

(72) Inventors: Ioannis Alexandros Assael, London (GB); Thomas Chadwick Walters, Bromley (GB); Archit Gupta, London (GB); Brendan Shillingford, London (GB)

(73) Assignee: DeepMind Technologies Limited, London (GB)

( * ) Notice: Subject to any disclaimer, the term of this patent is extended or adjusted under 35 U.S.C. 154(b) by 156 days.

(21) Appl. No.: 17/607,797

(22) PCT Filed: Apr. 30, 2020

(86) PCT No.: PCT/EP2020/061996
§ 371 (c)(1),
(2) Date: Oct. 29, 2021

(87) PCT Pub. No.: WO2020/221846
PCT Pub. Date: Nov. 5, 2020

(65) Prior Publication Data
US 2022/0223162 A1    Jul. 14, 2022

(30) Foreign Application Priority Data
Apr. 30, 2019   (GR) ............................... 20190100187

(51) Int. Cl.
*G10L 19/02*    (2013.01)
*G06N 3/08*    (2023.01)
(Continued)

(52) U.S. Cl.
CPC ............ *G10L 19/0204* (2013.01); *G06N 3/08* (2013.01); *G10L 25/18* (2013.01); *G10L 25/30* (2013.01); *G10L 25/57* (2013.01); *H04N 7/0125* (2013.01)

(58) Field of Classification Search
CPC ..... G10L 19/0204; G10L 25/18; G10L 25/30; G10L 25/57; G10L 21/0388; G06N 3/08; G06N 3/045; G06N 3/047; H04N 7/0125
See application file for complete search history.

(56) References Cited

U.S. PATENT DOCUMENTS 10,185,539 B2 *   1/2019   Bailey ...................... H03G 5/16
10,748,247 B2 *   8/2020   Paluri ...................... H04N 5/33
(Continued)

FOREIGN PATENT DOCUMENTS

| CN | 108010538 | 5/2018 |
|---|---|---|
| CN | 109074820 | 12/2018 |
| CN | 109147806 | 1/2019 |

OTHER PUBLICATIONS

Wang et al, Speech Super-Resolution Using Parallel WaveNet, IEEE ISCSLP 2018, pp. 260-264 (Year: 2018).*
(Continued)

*Primary Examiner* — Linda Wong
(74) *Attorney, Agent, or Firm* — Fish & Richardson P.C.

(57) ABSTRACT

Methods, systems, and apparatus, including computer programs encoded on computer storage media, for bandwidth extension. One of the methods includes obtaining a low-resolution version of an input, the low-resolution version of the input comprising a first number of samples at a first sample rate over a first time period; and generating, from the low-resolution version of the input, a high-resolution version of the input comprising a second, larger number of samples at a second, higher sample rate over the first time period. Generating the high-resolution version includes gen-
(Continued)

erating a representation of the low-resolution version of the input; processing the representation of the low-resolution version of the input through a conditioning neural network to generate a conditioning input; and processing the conditioning input using a generative neural network to generate the high/resolution version of the input.

20 Claims, 4 Drawing Sheets

(51) Int. Cl.
    *G10L 25/18*     (2013.01)
    *G10L 25/30*     (2013.01)
    *G10L 25/57*     (2013.01)
    *H04N 7/01*     (2006.01)

(56) References Cited

U.S. PATENT DOCUMENTS

| | | | |
|---|---|---|---|
| 2016/0140435 A1 | 5/2016 | Bengio et al. | |
| 2016/0212423 A1* | 7/2016 | Aharon | H04N 19/167 |
| 2017/0103752 A1 | 4/2017 | Senior et al. | |
| 2019/0208323 A1* | 7/2019 | Yazawa | H04S 7/00 |

OTHER PUBLICATIONS

Van den Oord et al, WaveNet: A generative model for Raw Audio, Sep. 19, 2016, https://arxiv.org/abs/1609.03499, pp. 1-15 (Year: 2016).*
Gupta et al., "Speech Bandwidth Extension with Wavenet," 2019 IEEE Workshop on Applications Of Signal Processing to Audio and Acoustics, Oct. 2019, pp. 205-208.
International Preliminary Report on Patentability in International Appln. No. PCT/EP2020/061996, dated Nov. 11, 2021, 10 pages.
International Search Report and Written Opinion in International Appln. No. PCT/EP2020/061996, dated Jul. 21, 2020, 16 pages.
Kalchbrenner et al., "Efficient neural audio synthesis," Proceedings of the 35th International Conference on Machine Learning, 2018, 80:2410-2419.
Lim et al., "Time-Frequency Networks for Audio Super-Resolution," 2018 IEEE International Conference on Acoustics, Speech and Signal Processing, Apr. 2018, pp. 646-650.
Oord et al., "Parallel WaveNet: Fast high-fidelity speech synthesis," Proceedings of the 35th International Conference on Machine Learning, 2018, 80:3918-3926.
Van den Oord et al., "WaveNet: A generative model for raw audio," CoRR, Sep. 2016, https://arxiv.org/abs/1609.03499, 15 pages.
Wang et al., "Speech Super-Resolution Using Parallel WaveNet," 2018 11th International Symposium on Chinese Spoken Language Processing, Nov. 2018, pp. 260-264.
Office Action in Chinese Appln. No. 202080031116.5, dated Jan. 5, 2024, 20 pages (with English translation).

* cited by examiner

BANDWIDTH EXTENSION OF INCOMING DATA USING NEURAL NETWORKS

CROSS-REFERENCE TO RELATED APPLICATION

This application is a National Stage Application under 35 U.S.C. § 371 and claims the benefit of International Application No. PCT/EP2020/061996, filed on Apr. 30, 2020, which claims priority to GR Application Serial No. 20190100187, filed on Apr. 30, 2019. The disclosure of the prior application is considered part of and is incorporated by reference in the disclosure of this application.

BACKGROUND

This specification relates to neural networks that generate high-resolution data.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that receives a low-resolution version of an input, i.e., of incoming data, and extends the bandwidth of the low-resolution version. In other words, the system generates a high-resolution version of the input. That is, the system receives a version of an input that has a first number of samples at a first sample rate over a first time period and then generates, from the received version, a version of the input that has a second, higher number of samples at a second, higher sample rate over the first time period. Once generated, the system can play back or present the high-resolution version of the input, i.e., instead of playing back or presenting the low-resolution version.

Particular embodiments of the subject matter described in this specification can be implemented so as to realize one or more of the following advantages.

The described systems can generate high-resolution versions of low-resolution input data, e.g., speech or other audio data or video data. Thus, high-resolution samples can be played back to a user while requiring only sufficient data to reconstruct the low-resolution version of the sample to be transmitted over a data communication network or stored, greatly reducing the amount of data that needs to be communicated in order for high-quality playback to achieved.

In the case of speech, the described systems can generate high-resolution versions of low-resolution speech without needing to receive any additional data over a communication channel, i.e., generate high-quality speech only from a low-bandwidth version of the input. As a particular example, the described techniques can be used to generate "HD-Voice"-quality audio from standard telephony-quality and GSM-quality audio. Thus, the described techniques can be used to improve audio quality in existing communication systems, e.g., VOIP or telephony systems, without needing to transmit more data over the communication channel or modify any of the infrastructure of the communication system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
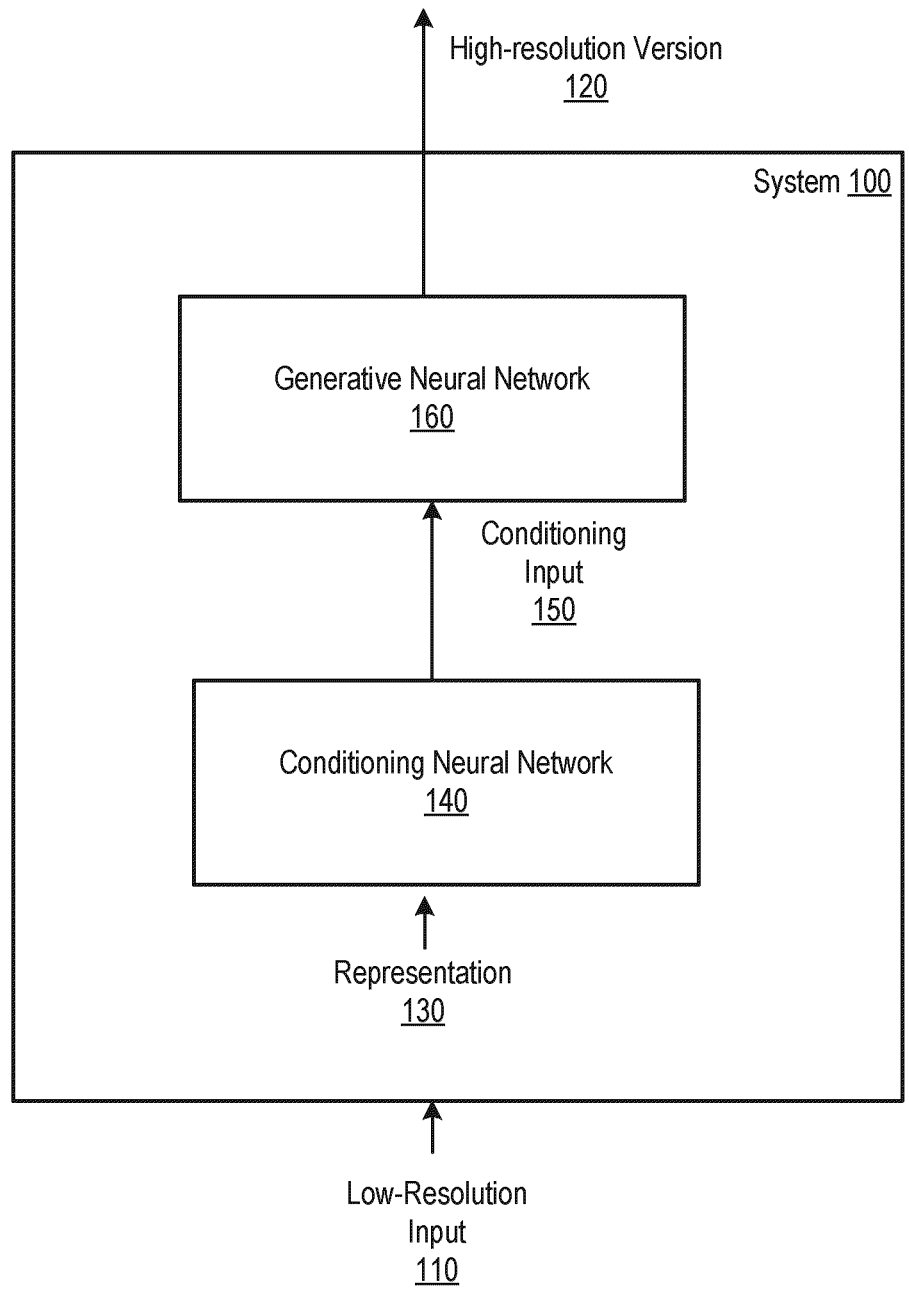
FIG. 1 shows an example bandwidth extension system.

FIG. 1 shows an example bandwidth extension system 100. The bandwidth extension system 100 is an example of a system implemented as computer programs on one or more computers in one or more locations, in which the systems, components, and techniques described below can be implemented.

The system 100 receives a low-resolution version 110 of an input, i.e., of incoming data, and extends the bandwidth of the low-resolution version. In other words, the system generates a high-resolution version 120 of the input, e.g., before the incoming data is played back or presented to a user.

That is, the system 100 receives a version of an input that has a first number of samples at a first sample rate over a first time period and then generates, from the received version, a version of the input that has a second, higher number of samples at a second, higher sample rate over the same first time period.

For example, the system 100 can receive an audio waveform having a first sample rate and generate, from the received audio waveform, an audio waveform that has a larger number of samples at a higher sample rate. For example, the system 100 can receive an 8 kHz speech signal representing an utterance and generate, from the 8 kHz speech signal, a 24 kHz speech signal representing the same utterance.

As a particular example, the system 100 can be implemented at a communication node that receives low-resolution speech over a data communication network. For example, the system 100 can receive and decode an encoded audio signal as part of a communication session, e.g., an audio call over a cellular network, a voice over IP call over an Internet Protocol network, or a video chat over the Internet, to obtain the low-resolution speech. Unlike conventional systems which play back the decoded speech directly, the system 100 can first generate high-resolution speech using the described techniques and then play back the high-resolution speech in place of the decoded speech.

This allows the system 100 to play back high-resolution and high-quality speech to a user by extending the bandwidth of a band-limited incoming speech signal that may have been passed through a low-rate codec and without needing to modify the transmission channel, i.e., without needing to increase the bandwidth of the transmission channel or any other infrastructure of the transmission channel or to modify the codec used to encode the speech.

As another example, the input can include a video. In this example, the low-resolution version of the input includes a set of video frames at a first frame rate and the high-resolution version of the input includes video frames at a second, higher frame rate, with both versions covering the same time period in the video.

As another particular example, the system 100 can be implemented at a communication node that receives low frame rate video over a data communication network. For example, the system 100 can receive and decode an encoded video signal as part of a communication session, e.g., a video chat over the Internet, to obtain the low-resolution video. As another example, the system 100 can receive and decode an encoded streaming video signal to obtain the low frame rate video. Unlike conventional systems which play back the decoded video directly, the system 100 can first generate higher-frame rate video using the described techniques and then play back the higher-frame rate video in place of the decoded video.

This allows the system 100 to play back high frame rate and high-quality video to a user using by extending the bandwidth of the incoming video signal without needing to modify the codec used to encode the video or to increase the amount of data that is transmitted over the data communication network.

In particular, the system 100 can generate a representation 130 of the low-resolution version 110 of the input and then process the representation 130 through a conditioning neural network 140 to generate a conditioning input 150.

The architecture of the conditioning neural network 140 will generally depend on the type of inputs that are having their bandwidth extended and on the representations 130 of those inputs. Generally, however, the conditioning neural network 140 is configured to upsample the representation, e.g., by a factor, of two, four, or eight, so that the resulting conditioning input 150 can be effectively used to generate the high-resolution version.

As a particular example, the conditioning neural network 140 can be a convolutional neural network that upsamples the representation 130 to generate the conditioning input 150. An example of such a convolutional neural network will be described below with reference to FIG. 2.

In some implementations, when other context information is available, the system 100 can also use the other context information in generating the conditioning input 150. For example, in the case of speech the other context information can include data characterizing the speaker, e.g., an identifier for the speaker or data characterizing the speech patterns of the speaker, or data characterizing the context of the conversation, e.g., the topic of the conversation, the language of the conversation, and so on.

For example, the conditioning neural network 140 can also process the additional context information or the additional context information can be combined with the output of the conditioning neural network 140 to generate the conditioning input 150.

The system 100 can then process the conditioning input 150 using a generative neural network 160 to generate the high-resolution version of the input 120.

The generative neural network 160 can have any of a variety of architectures that allow the neural network 160 to generate high-resolution outputs from conditioning inputs representing low-resolution inputs.

For example, the generative neural network 160 can be an auto-regressive neural network that generates each sample in the high-resolution version 120 of the input conditioned on (i) the conditioning input 150 and (ii) any samples in the high-resolution version 120 of the input that have already been generated. That is, the generative neural network 160 can generate the samples in the high-resolution version 120 sequentially, with each sample being generated conditioned on (i) the conditioning input 150 and (ii) the samples in the high-resolution version 120 of the input that are before the current sample in the sequence.

One example of an auto-regressive neural network is an auto-regressive convolutional neural network that includes dilated convolutional layers, e.g., a convolutional neural network that includes multiple stacks of dilated convolutional layers. To generate a given sample in the sequence, such a convolutional neural network processes any samples in the high-resolution version 120 of the input that are before the current sample in the sequence to generate an output distribution over sample values and then samples a value from the output distribution.

In order to effectively condition the generation of the given sample on the conditioning input 150, the activation function of at least some of the dilated convolutional layers in the convolutional neural network is conditioned on the conditioning input 150.

A particular example of an auto-regressive convolutional neural network that includes dilated convolutional layers that have activation functions that are conditioned on conditioning inputs is the WaveNet, which is described in more detail in A. van den Oord, S. Dieleman, H. Zen, K. Simonyan, O. Vinyals, A. Graves, N. Kalchbrenner, A. W. Senior, and K. Kavukcuoglu, "WaveNet: A generative model for raw audio." in SSW, 2016, p. 125.

Another example of an auto-regressive neural network is a recurrent neural network that maintains and updates an internal state for each sample, i.e., by processing the most recent sample in the sequence, and then uses the updated internal state to generate the sample. A particular example of a recurrent neural network that can be used to generate high-resolution data is the WaveRNN, which is described in N. Kalchbrenner, E. Elsen, K. Simonyan, S. Noury, N. Casagrande, E. Lockhart, F. Stimberg, A. Oord, S. Dieleman, and K. Kavukcuoglu, "Efficient neural audio synthesis," in International Conference on Machine Learning, 2018, pp. 2415-2424.

In some other implementations, the generative neural network 160 is a feedforward neural network that is conditioned on (i) the conditioning input and (ii) a noise vector. For example, the feedforward neural network can be a convolutional neural network that includes multiple dilated convolutional layers that have activation functions that are conditioned on the conditioning input. Such a convolutional neural network is configured to process as input a noise vector having the same number of samples as the high-resolution version to generate respective output distributions for all of the samples in the high-resolution version in parallel. The neural network can then sample values from the output distributions or greedily select values from the output distributions. A particular example of a feedforward convolutional neural network is the Parallel WaveNet, which is described in A. van den Oord, Y. Li, I. Babuschkin, K. Simonyan, O. Vinyals, K. Kavukcuoglu, G. van den Driessche, E. Lockhart, L. Cobo, F. Stimberg, N. Casagrande, D. Grewe, S. Noury, S. Dieleman, E. Elsen, N. Kalchbrenner, H. Zen, A. Graves, H. King, T. Walters, D. Belov, and D. Hassabis, "Parallel WaveNet: Fast high-fidelity speech synthesis," in Proceedings of the 35th International Conference on Machine Learning, ser. Machine Learning Research, vol. 80. Stockholmsmssan, Stockholm Sweden: PMLR, 2018, pp. 3918-3926.

In order for the conditioning neural network 140 and the generative neural network 160 to be effectively used to generate high-resolution data, the system 100 trains the two neural networks on training data.

Training the neural networks on training data is described in more detail below with reference to FIG. 4.

Figure 2:
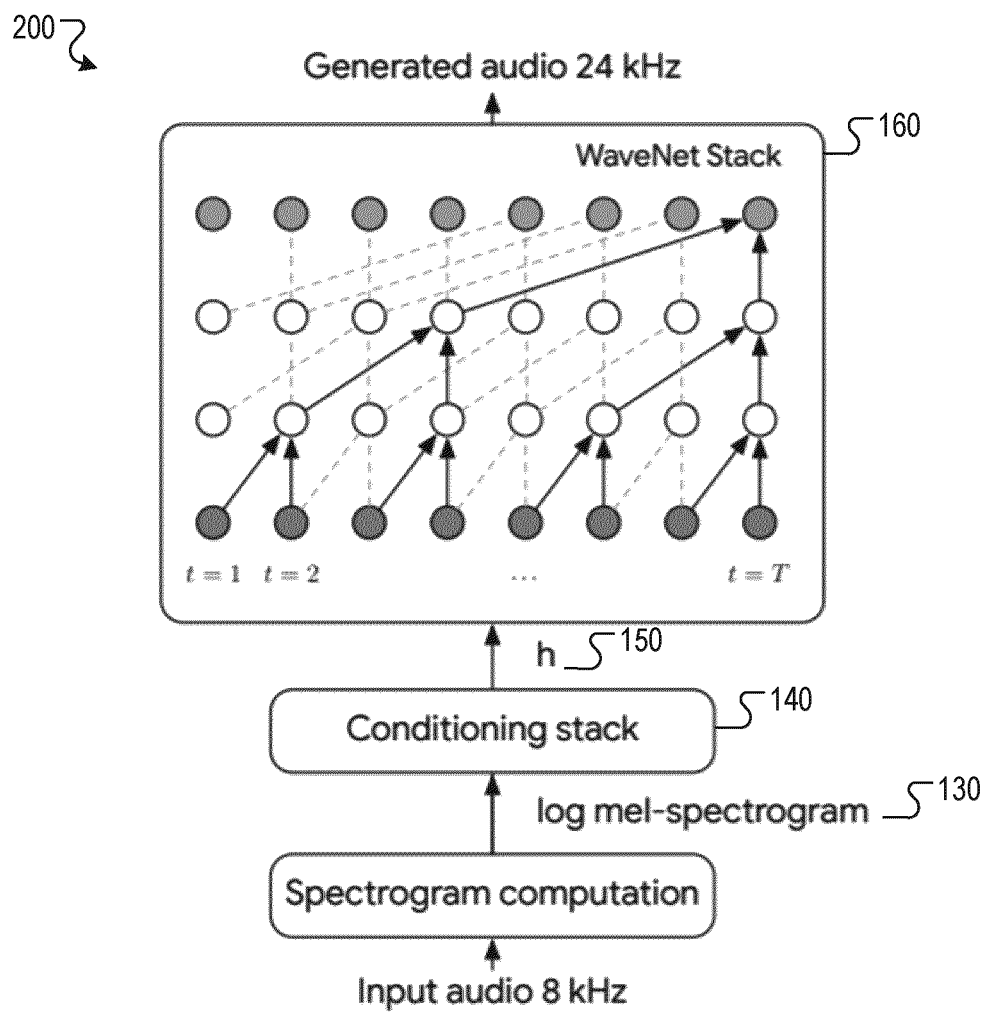
FIG. 2 shows an example implementation of the bandwidth extension system.

FIG. 2 shows an example implementation of the system 100 when the input to the system is audio data. In particular, in the example of FIG. 2, the system 100 receives an 8 kHz audio signal and generates as output a 24 kHz version of the audio signal. For example, the input can be an 8 kHz speech signal representing an utterance and the output can be a 24 kHz speech signal representing the same utterance.

In the example implementation of FIG. 2, the representation 130 of the input audio signal is spectrogram of the input audio signal. In other words, the system 100 generates, from the raw waveform of the low-resolution version, i.e., the raw waveform of the 8 kHz audio, a spectrogram of the low-resolution version.

More specifically, the spectrogram that the system 100 generates is a log mel-spectrogram.

As a particular example, the system can compute the log mel-spectrogram by using a Hann window of 50 ms with a step size of 12.5 ms on the raw input waveform and then mapping the window to 80 mel-frequency bins ranging from 125 Hz up to the Nyquist frequency of the input signal. In this particular example, the system can generate the log mel-spectrogram as a sequence of vectors of length 80 at a rate of 80 Hz.

In other implementations, however, the system can instead use the raw input audio as the representation that is provided as input to the conditioning neural network. In other words, the system can use the raw waveform of the low-resolution version of the audio as the representation that is provided as input to the conditioning neural network.

The system then processes the representation 130, i.e., the log mel-spectrogram or the raw audio, depending on the implementation, using the conditioning neural network ("conditioning stack") 140 to generate the conditioning input ("h") 150.

The architecture of the conditioning neural network 140 will generally depend on the type of inputs that are having their bandwidth extended and on the representation of those inputs.

As a particular example, when the input is audio, the conditioning neural network 140 can include a stack of convolutional layers, e.g., dilated convolutional layers, optionally followed by one or more transpose convolutional layers. In one particular example, the conditioning neural network 140 includes five dilated convolutional layers, followed by two transpose convolutions to upsample the 80 Hz representation by a factor of four.

The system processes the conditioning input 150 using the generative neural network 160 to generate the 24 kHz output audio. In the example of FIG. 2, the generative neural network 160 is referred to as a "WaveNet stack" because it is an auto-regressive convolutional neural network that has a WaveNet architecture: multiple stacks of dilated convolutional layers with skip connections, with the dilation increasing within each of the multiple stacks.

In some implementations, prior to processing the already generated samples through the multiple stacks of dilated convolutional layers, the generative neural network 160 can, for each already generated sample, normalize the sample, e.g., in the range [−1, 1] and pass the normalized sample through a convolutional layer, e.g., with filter size 4 and 512 filters, to generate the input to the multiple stacks of dilated convolutional layers.

To generate the output distribution for a given sample, the generative neural network 160 can pass the output from the skip connections through two convolutional layers with 256 filters each and then model the output distribution over sample values using a quantized logistic mixture, e.g., a mixture with 10 components.

Figure 3:
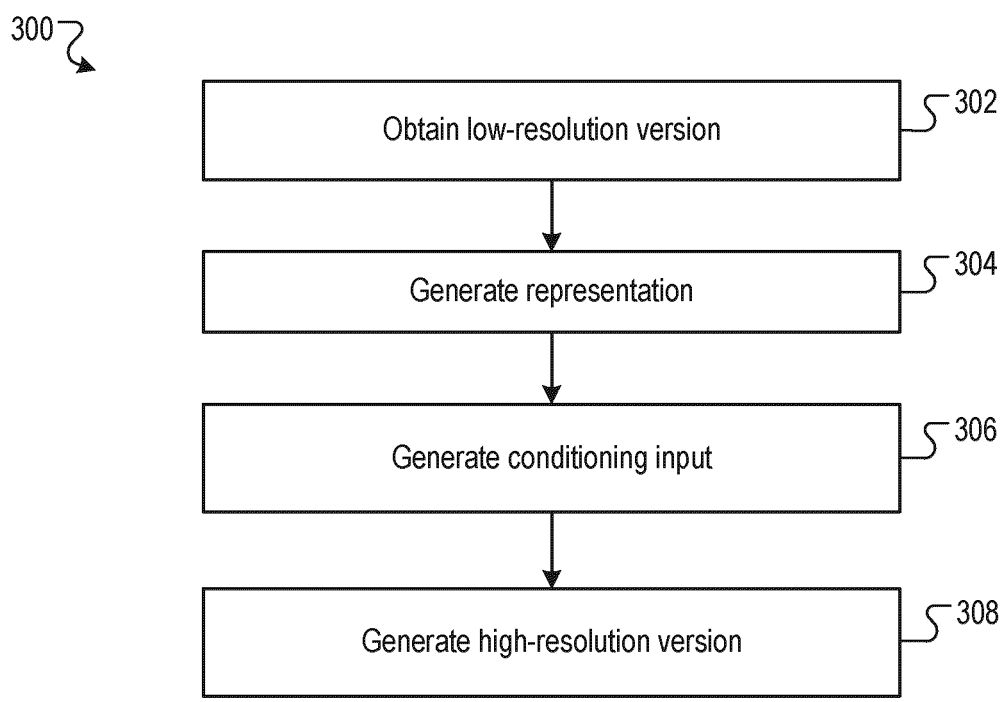
FIG. 3 is a flow diagram of an example process for generating a high-resolution version of an input.

FIG. 3 is a flow diagram of an example process 300 for generating a high-resolution version of a low-resolution input. For convenience, the process 300 will be described as being performed by a system of one or more computers located in one or more locations. For example, a bandwidth extension system, e.g., the bandwidth extension system 100 of FIG. 1, appropriately programmed, can perform the process 300.

The system obtains a low-resolution version of an input (step 302). For example, the system can receive the low-resolution version of the input over a data communication network or can decode an encoded input that was received over the data communication network in order to generate the low-resolution version. The low-resolution version of the input includes a first number of samples at a first sample rate over a first time period.

The system generates a representation of the low-resolution version of the input (step 304). As described above, while in some cases the system processes raw low-resolution data to generate the representation, in other cases the system uses the raw low-resolution data as the representation.

The system processes the representation of the low-resolution version of the input through a conditioning neural network to generate a conditioning input (step 306).

The system processes the conditioning input using a generative neural network to generate a high-resolution version of the input (step 308). The high-resolution version of the input includes a second, larger number of samples at a second, higher sample rate over the same first time period.

Figure 4:
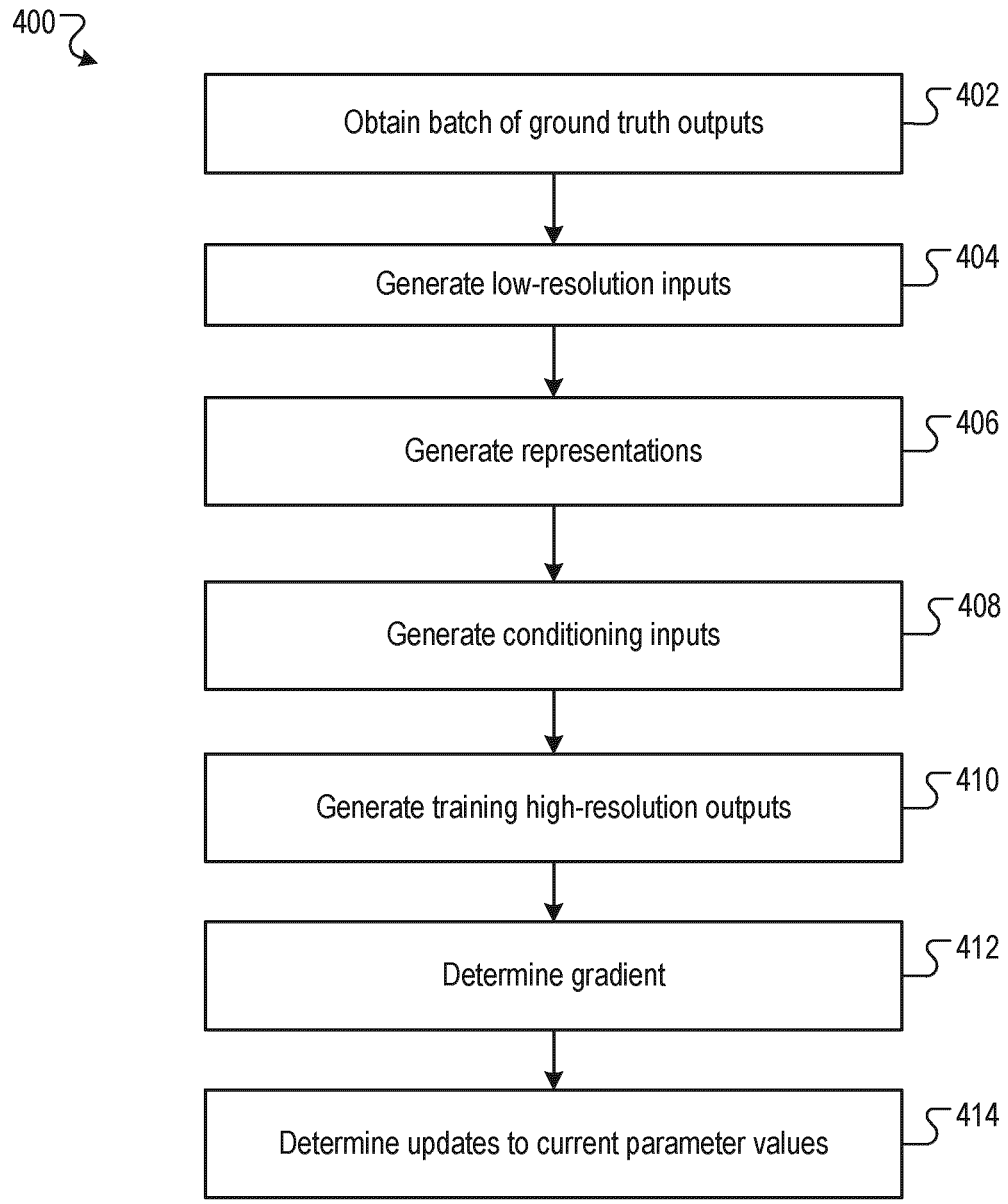
FIG. 4 is a flow diagram of an example process for training the conditioning neural network and the generative neural network.

FIG. 4 is a flow diagram of an example process 400 for training the conditioning neural network and the generative neural network. For convenience, the process 400 will be described as being performed by a system of one or more computers located in one or more locations. For example, a bandwidth extension system, e.g., the bandwidth extension system 100 of FIG. 1, appropriately programmed, can perform the process 400.

The system 400 can repeatedly perform the process 400 to repeatedly update the parameters of the two neural networks, i.e., to train the neural networks jointly. For example, the system can continue performing the process 400 for a specified number of iterations, for a specified amount of time, or until the change in the values of the parameters falls below a threshold.

The system obtains a batch of ground truth high-resolution outputs, i.e., high-resolution versions of training inputs (step 402). In other words, the system obtains a batch of actual data that has the same resolution as the high-resolution outputs to be generated by the generative neural network.

The system generates, from each ground truth high-resolution version of a training input, a training low-resolution version of the training input (step 404).

For example, the system can generate the training low-resolution version by down-sampling the ground truth high-resolution version to have the lower resolution using a conventional down-sampling technique.

As another example, the system can generate the training low-resolution version by running the ground truth version through a codec, e.g., the GSM-FR codec or the Adaptive MultiRate Wideband (AMR-WB) codec for audio data, that is designed to yield lower resolution versions after decoding. In other words, the system generates the training low-resolution version by encoding the ground truth high-resolution version using the audio encoder of the codec and then decoding the encoded ground truth using the decoder of the codec.

The system generates, for each training low-resolution version, a representation of the training low-resolution version (step 406), i.e., as described above.

The system processes, for each training low-resolution version, the representation of the training low-resolution version through the conditioning neural network in accordance with current values of the parameters of the conditioning neural network to generate a training conditioning input (step 408) and processes the training conditioning input using the generative neural network in accordance with current values of the parameters of the conditioning neural network to generate a training high-resolution version of the training input (step 410). In other words, the system generates a high-resolution version of the training input from the low-resolution version as it would during inference, i.e., after training. However teacher forcing may be used where during training inputs to the (autoregressive) generative neural network are conditioned on earlier high resolution samples of the ground truth version of the training input rather than on already generated samples of high-resolution version of the training input, i.e., already generated samples from the generative neural network.

The system then determines a gradient, with respect to the parameters of the conditioning neural network and the generative neural network, of an objective function that measures, for each high-resolution version in the batch, an error between (i) the high-resolution version of the training input, i.e., the ground truth output, and (ii) the training high-resolution version of the training input (step 412). For example, the objective function can be a negative log-likelihood loss function. Because the neural networks are being trained jointly, the system backpropagates gradients from the generative neural network into the conditioning neural network in order to compute the gradient with respect to the parameters of the conditioning neural network.

The system then determines, from the computed gradient, updates to the current values of the parameters of the conditioning neural network and the generative neural network, i.e., by applying an appropriate update rule, e.g., a stochastic gradient descent learning rate, an Adam update rule, or an rmsProp update rule, to the computed gradient (step 414).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for improving communication quality on a data communications network, the method comprising:
  receiving, at a communications node of the data communications network, an encoded input signal representing an input;
  decoding, at the communications node of the data communications network, the encoded input signal using a decoder of a codec to generate a low-resolution version of the input, the low-resolution version of the input comprising a first number of samples at a first sample rate over a first time period; and
  generating, from the low-resolution version of the input generated by decoding the encoded input signal, a high-resolution version of the input comprising a second, larger number of samples at a second, higher sample rate over the first time period, the generating comprising:
    generating a representation of the low-resolution version of the input generated by decoding the input signal;
    processing the representation of the low-resolution version of the input generated by decoding the input signal through a conditioning neural network to generate a conditioning input; and
    processing the conditioning input using a generative neural network to generate the high-resolution version of the input.

2. The method of claim 1, wherein the input is audio data, wherein the low-resolution version of the input comprises an audio waveform at the first sample rate, and wherein the high-resolution version of the input comprises an audio waveform at the second sample rate.

3. The method of claim 2, wherein the audio data is an utterance, the low-resolution version is a low-resolution speech signal of the utterance, and the high-resolution version is a high-resolution speech signal of the utterance.

4. The method of claim 2, wherein generating the representation of the low-resolution version of the input comprises:
  generating, from a raw waveform of the low-resolution version, a spectrogram of the low-resolution version.

5. The method of claim 4, wherein the spectrogram is a log-mel spectrogram.

6. The method of claim 2, wherein generating the representation of the low-resolution version of the input comprises:
  using a raw waveform of the low-resolution version of the input as the representation.

7. The method of claim 1 wherein the conditioning neural network comprises a stack of convolutional layers.

8. The method of claim 7, wherein the convolutional layers comprise dilated convolutional layers.

9. The method of claim 7, wherein the conditioning neural network comprises one or more transpose convolutional layers following the stack of convolutional layers.

10. The method of claim 1, wherein the generative neural network is an auto-regressive neural network that generates each sample in the high-resolution version of the input conditioned on (i) the conditioning input and (ii) any samples in the high-resolution version of the input that have already been generated.

11. The method of claim 10, wherein the generative neural network is a convolutional neural network comprising dilated convolutional layers.

12. The method of claim 11, wherein an activation function of at least some of the dilated convolutional layers is conditioned on the conditioning input.

13. The method of claim 10, wherein the generative neural network is a recurrent neural network.

14. The method of claim 1, wherein the generative neural network is a feedforward neural network that is conditioned on (i) the conditioning input and (ii) a noise vector.

15. The method of claim 1, wherein the input is a video, and wherein the low-resolution version of the input comprises video frames at a first frame rate, and wherein the high-resolution version of the input comprises video frames at a second, higher frame rate.

16. The method of claim 1, wherein the generative neural network has been trained by performing operations comprising:
  obtaining a ground truth high-resolution version of a training input;
  generating, from the ground truth high-resolution version of the training input, a training low-resolution version, comprising:
    encoding the ground truth high-resolution version using an encoder of the codec to generate an encoded ground truth; and
    decoding the encoded ground truth using the decoder of the codec;
  generating a representation of the training low-resolution version;
  processing the representation of the training low-resolution version through the conditioning neural network in accordance with current values of the parameters of the conditioning neural network to generate a training conditioning input;
  processing the training conditioning input using the generative neural network in accordance with current values of the parameters of the conditioning neural network to generate a training high-resolution version of the training input;
  determining a gradient of an objective function that measures an error between (i) the ground truth high-resolution version of the training input and (ii) the training high-resolution version of the training input; and
  determining, from the gradient, updates to the current values of the parameters of the conditioning neural network and the generative neural network.

17. The method of claim 16, wherein
the training input is an audio input and wherein encoding the ground truth high-resolution version comprises encoding the ground truth high-resolution version using an audio encoder.

18. The method of claim 16, wherein the generative neural network is an auto-regressive neural network that, during the training, generates each sample in the training high-resolution version of the input conditioned on (i) the training conditioning input and (ii) any samples in the ground truth high-resolution version of the input that precede the sample in the training high-resolution version.

19. A system comprising one or more computers and one or more storage devices storing instructions that when executed by one or more computers cause the one or more computers to perform operations for improving communication quality on a data communications network, the operations comprising:
  receiving, at a communications node of the data communications network, an encoded input signal representing an input;
  decoding, at the communications node of the data communications network, the encoded input signal using a decoder of a codec to generate a low-resolution version of the input, the low-resolution version of the input comprising a first number of samples at a first sample rate over a first time period; and
  generating, from the low-resolution version of the input generated by decoding the encoded input signal, a high-resolution version of the input comprising a second, larger number of samples at a second, higher sample rate over the first time period, the generating comprising:
    generating a representation of the low-resolution version of the input generated by decoding the input signal;
    processing the representation of the low-resolution version of the input generated by decoding the input signal through a conditioning neural network to generate a conditioning input; and
    processing the conditioning input using a generative neural network to generate the high-resolution version of the input.

20. One or more non-transitory computer-readable storage media storing instructions that when executed by one or more computers cause the one or more computers to perform operations for improving communication quality on a data communications network, the operations comprising:
  receiving, at a communications node of the data communications network, an encoded input signal representing an input;
  decoding, at the communications node of the data communications network, the encoded input signal using a decoder of a codec to generate a low-resolution version of the input, the low-resolution version of the input comprising a first number of samples at a first sample rate over a first time period; and
  generating, from the low-resolution version of the input generated by decoding the encoded input signal, a high-resolution version of the input comprising a second, larger number of samples at a second, higher sample rate over the first time period, the generating comprising:
    generating a representation of the low-resolution version of the input generated by decoding the input signal;
    processing the representation of the low-resolution version of the input generated by decoding the input signal through a conditioning neural network to generate a conditioning input; and
    processing the conditioning input using a generative neural network to generate the high-resolution version of the input.

* * * * *